Figure 12:
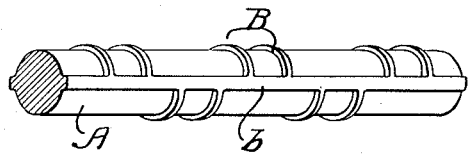

K. R. SCHUSTER.
STRUCTURAL BAR.
APPLICATION FILED NOV. 18, 1919.
1,339,226.
Patented May 4, 1920.
2 SHEETS—SHEET 1.
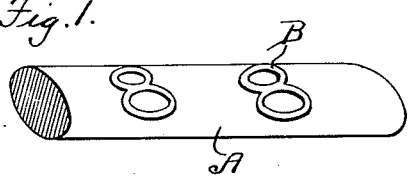
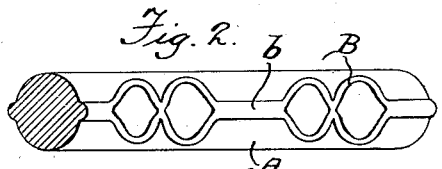
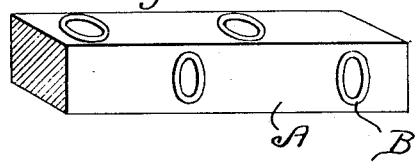
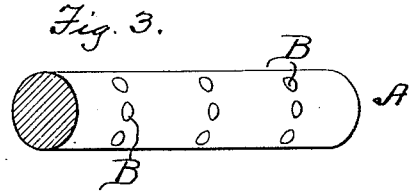
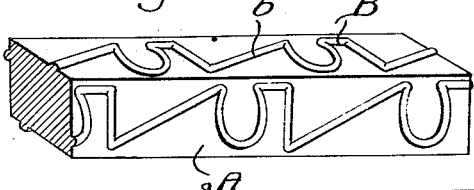
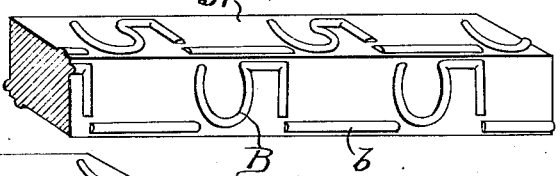
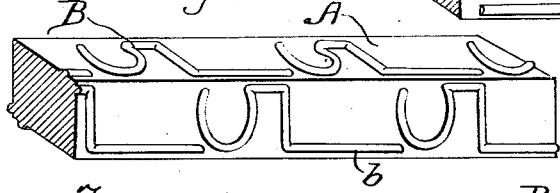
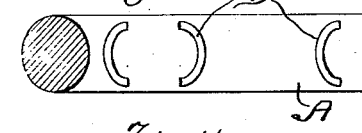
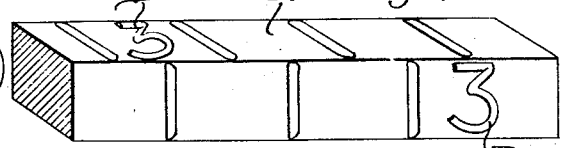
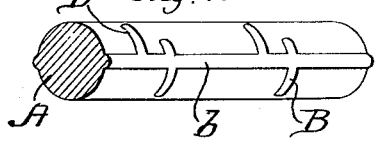
Inventor
Karl R. Schuster
By his Attorney

K. R. SCHUSTER.
STRUCTURAL BAR.
APPLICATION FILED NOV. 18, 1919.

1,339,226.

Patented May 4, 1920.

2 SHEETS—SHEET 2.

Inventor
Karl R. Schuster
By his Attorney

UNITED STATES PATENT OFFICE.

KARL R. SCHUSTER, OF BROOKLYN, NEW YORK.

STRUCTURAL BAR.

1,339,226.  Specification of Letters Patent.  Patented May 4, 1920.

Application filed November 18, 1919. Serial No. 338,909.

*To all whom it may concern:*

Be it known that I, KARL R. SCHUSTER, of the city of New York, borough of Brooklyn, county of Kings, and State of New York, have invented a certain new and useful Structural Bar, of which the following is a specification.

This invention is a metal bar to be used in various kinds of structural work, more particularly as a reinforcing bar for concrete building, and other structures.

In bars used, or intended to be used, for reinforcing structures composed in whole or in part of concrete, or in composite structures wherein reinforced concrete is utilized, it is not unusual to employ the so called deformed bars the deformations of which serve the function of a mechanical bond or key whereby the bar is precluded from displacement in the material within which it is embedded in whole or in part, the effect of which is to securely anchor the reinforcing bar within the concrete.

Practical experience shows that difficulty is met with in the work of selecting and assorting bars of corresponding size, or possessing other characteristics, preparatory to the work of installing the same in the concrete, and this difficulty is particularly encountered in the erection of buildings when, as frequently happens, bars of the same general character but differing somewhat in dimensions are supplied for the same building or job.

It is common practice to pack and ship bars of one size in a bundle, whereas bars of other sizes are packed and shipped in other bundles, but in the work of hoisting and distributing the bars at the place of erecting the building or other structure, the bars of different sizes become mixed indiscriminately in a mass so as to render it necessary to select the bars of each size and to assort the different sizes preliminary to their installation. Trained superintendents of construction and experienced mechanics find it difficult to select bars which vary in diameter 1/16 of an inch, or even 1/8 of an inch, and experience shows that few men can without measurement detect a 7/8" bar from a 1", whereas practically no man, however experienced can determine without accurate measurement a 13/16" bar from a 14/16" bar. This difficulty is, in part, due to more or less irregularity at the ends of the bars owing to the fact that such end portions become flattened or otherwise distorted by the shearing or cutting operation employed in cutting the bars to length. Furthermore, the operation of measuring many deformed bars now so extensively used is more difficult than that of measuring plain bars. It follows that workmen in the field are unable without accurate measurement to detect the differences in the dimensions of the bars, and hence no inconsiderable amount of time and labor are required to measure the bars and to assort the same, such measurements of the bars being performed more readily at the end portions of said bars.

According to this invention, provision is made for indicating the dimensions, or other physical characteristics, of the bars, which indicating means are unitary with the bars, whereby a simple inspection of each bar will indicate its dimensions, as a result of which a material economy of time and labor is attained in selecting and assorting the bars, for the reason that no time or labor is expended in the measurement of the bars prior to the operations of selecting and assorting the same.

In a practical embodiment of the invention, the indicating character and the deformations of the bar constitute one element, the same being unitary with the bar, preferably integral therewith. The bar is rolled, or otherwise produced, so as to form at the same operation the deformations and the indicating characters, such indicating character or characters being on the surface or surfaces of the bars so as to be exposed to the view of the workman engaged in selecting and assorting the bars, and thus the workman is able as he looks at or handles a bar to ascertain its dimensions and to assort the same with facility and without being required to spend time and labor in the measurement of the bar.

It may be stated that the bar is provided with deformations some of which indicate the physical character, such as diameter, of the bar whereas other deformations serve merely as the mechanical key for the bar when used in connection with concrete. Again, the bar is or may be provided with deformations so positioned as to render the area of cross section of the bar substantially uniform, and, further, the form of the deformations are such as to avoid the use of pockets upon the surface of the bar, for the reason that the presence of the pockets in the indicating deformations are undesirable owing to the fact that the concrete does not or will not enter and fill such pockets on the undersurface of the bar.

Other functions and advantages of the invention will appear from the following description taken in connection with the drawings, wherein—

Figure 1 is a perspective view of a bar provided with dimension indicating deformations in accordance with this invention.

Figs. 2 to 11 inclusive are similar views illustrating other shapes of the measurement indicating deformations of bars embodying my invention.

Figure 13:
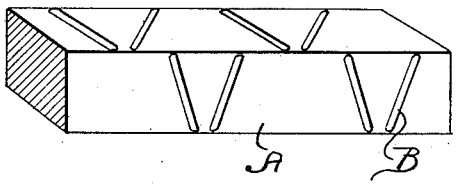
Figure 14:
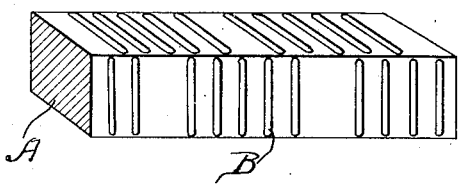
Figure 15:
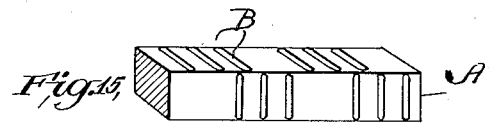
Figure 16:
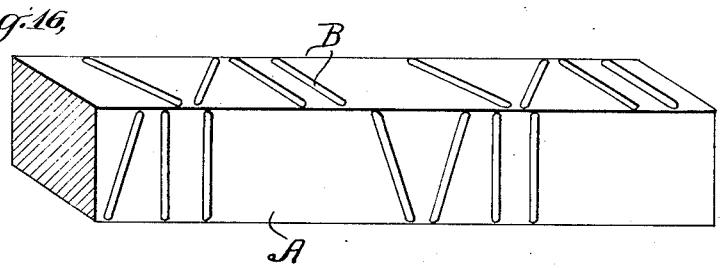
Figure 17:
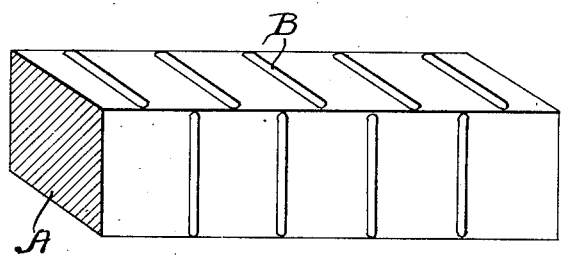

Figs. 12 to 17 inclusive illustrate bars of various dimensions and forms provided with deformations in the form of Roman figures which can easily be rolled with the bar and which figures indicate the diameters of the various bars.

A indicates a bar in all the figures of the drawing, and in Fig. 1, B is a measurement indicating deformation of a particular form. The bars are shown as being of different forms in cross section; thus in Fig. 1 the bar is oval in cross section; in Figs. 2, 3, 10 and 11 they are circular in cross section or substantially so; Figs. 4, 6, 7, 8 and 9 show bars square in cross section, whereas Fig. 5 illustrates a bar rectangular in cross section.

Usually the bar is rolled to form and cross sectional dimensions by appropriate rolling mills or machinery, after which the bars are cut to length. During such rolling operation, the bars are formed with indicating means and with deformations; in a preferred form, the deformations and the indicating means are one and the same element, although my invention embodies, also, a form of construction wherein the measurement indicating means are separate from the key deformations.

As illustrative of my invention, the deformations indicate the cross sectional dimensions of the bar, having adopted for this purpose the metric system as the standard of measurement, although it will be understood that any other system of measurement may be utilized, and, further, that the indications afforded by the deformations may if desired be of such a character as to state any other desired characteristic of the bar. Preferably, I roll the bars of one uniform shape, but the bars are of different cross section dimensions; thus, bars oval, circular or square in cross section will vary 1/16" in cross sectional dimensions. The smallest bar rolled is 4/16" in diameter, and for such a bar I provide a deformation corresponding to the numeral 4 (see Fig. 11) as indicating that the cross sectional dimensions are 4/16 of an inch. As shown, the numbers 4 are connected up by ribs $b$ so that the deformations B at the opposite sides of the bar will result in a bar uniform in cross section, or substantially so.

The indicating characters may be of any desired form; thus Arabic figures are shown in Figs. 1, 2, 4, 5, 6, 7, 8 and 9, whereas dots are shown in Fig. 3, but it is apparent that Roman figures or dashes may be employed.

In Fig. 1 the bar is oval in cross section and the area of cross section is equal to the area of an 8/16" diameter round bar, hence the indicating and keying deformations B are in the form of the numeral 8, to indicate that the bar is 8/16" diameter; the said deformation being produced upon the surface of the bar in the operation of rolling the same. Such deformations are provided on the opposite sides of the oval bar, and they are spaced at suitable intervals, so as to be easily inspected.

The bar shown in Fig. 2 is circular in cross section and 8/16" diameter. Accordingly, the deformations are in the form of the numeral 8 connected by the ribs $b$, the numbers and the ribs extending longitudinally and so positioned that the numbers and ribs at diametrically opposite sides produce a bar uniform in cross section, or substantially so.

A round bar of 3/4" diameter is shown in Fig. 3, and the deformations B are in the form of dots arranged in groups to indicate that the bar is 3/4" diameter.

Fig. 4 illustrates a bar of square cross section 10/16" in diameter. The deformations B are in the form of an O to indicate the cross sectional dimensions, said indicating deformations being provided at intervals on the several faces of the bar. In practice it is found that the use of numerals the outlines of which are curved so as to be continuous, or substantially so, result in the formation of pockets upon the surface or surfaces of the bar, and in some instances, particularly where the pockets come upon the under surface of the bar, the cement or concrete will not enter such pockets so as to effectually key the bar and the bonding material. To overcome this, the parts of the figures indicating the deformations may be separated or spread apart as shown in Fig. 10, the latter representing a 10/16" bar of circular cross section and with deformations of such a character as tend to increase the area of the mechanical bond or key afforded by such deformations.

A flat 5/16" bar is shown in Fig. 5, wherein the deformations B are in the form of straight cross ribs representing the number 1, which straight cross ribs are replaced at intervals by ribs in the form of the number 5, so that the number 5 is indicative of the cross sectional dimensions (5/16″) of the bar.

The figures denoting a 15/16″ bar may be variously arranged as in Figs. 6, 7 and 8, the same showing a bar of the specified dimensions and approximately square in cross section. In Figs. 6 and 8 the projections or ribs corresponding to the numeral 1 are joined with the terminals of the ribs corresponding to numerals 5, so as to produce a deformation extending continuously of the bar on the surfaces thereof, whereas in Fig. 7 the deformations are disconnected while forming the numbers indicating the cross sectional dimensions of the bar. The bars shown in Figs. 6, 7 and 8 are rolled with the deformations, the latter being positioned so as to result in a bar substantially uniform in area of cross section. The projections or ribs are intermediate the numerals in Figs. 6, 7 and 8, and they are provided on the several surfaces of the bars whereby the area of cross section of the bar is rendered substantially uniform along the lines of the formations on opposite surfaces of the bar.

A bar square in cross section is shown in Fig. 9 as being provided on the several surfaces thereof with transverse deformations in the form of straight ribs and with the numerals 3, the latter being between or intermediate the straight deformations.

In Figs. 12 to 17 both inclusive I have shown bars A of various dimensions each bar having deformations B in the form of Roman figures indicative of the diameter of the bar. It is not considered necessary to enter into a detailed explanation of the figures shown.

From the foregoing description taken in connection with the drawings it will be seen that I have produced a bar the salient feature of which is the deformations of such a nature as to indicate a physical characteristic of the bar, such as its dimensions. The deformations thus serve a twofold purpose, i. e., as a key or mechanical bond for retaining the bar against displacement in concrete material so as to act as an effective anchor, and as a means for indicating at a glance the dimensions or other physical character of the bars in a manner to save time and labor in selecting a particular bar from a pile or in assorting the different dimension bars of a mass of bars into separate groups or bundles whereof all the bars of similar dimensions are assembled into one pile or bundle. The bars of my invention may be assorted with facility so as to avoid the commission of dangerous mistakes, and as the workman is not required to individually measure each bar at the end thereof a marked economy of time and labor is attainable.

Ordinarily it is sufficient to use characters on the bars indicative of the diameter; the diameter being known, it is easy to determine the area of the cross section and the weight of the bars.

As one mode of indicating bars of different diameters I would mark a 4/16″ bar with the numeral 4 (Fig. 11) a 5/16″ bar with the numeral 5 (Fig. 5) or a 15/16″ bar with the numeral 5 and associate the numeral 1 therewith so as to denote 15 (Figs. 6, 7 and 8); a 6/16″ bar is marked with 6; a 7/16″ bar with the numeral 7 and so on.

Obviously, the bars can be rolled ranging 1/8″ or 1/4″ variation in diameter, and the indicating deformations based on such variations. Again, the deformations may be in the form of depressions instead of the projections shown in the drawings. Nor is it required that every deformation necessary to secure the mechanical bond or key be made in the shape of a numeral, for the reason that it is apparent that ordinary projections of any design can be used in conjunction with figures or signs indicative of the diameter, area of cross section, or other physical characteristic of the bar can be employed, such keys and indicating signs being preferably spaced two, three or more feet apart and on one or more surfaces of the bar. Such an arrangement results in simplification of the rolls and a small saving in the metal required to produce the bar.

Having thus fully described the invention, what I claim as new, and desire to secure by Letters Patent is:—

1. A bar for structural purposes provided with deformations affording a mechanical bond and of a character indicative of a physical property of the bar.

2. A bar for structural purposes provided on the surface thereof with deformations affording a mechanical bond and of a character indicative of the diameter of said bar, such deformations being visibly displayed at intervals on the surface of the bar.

3. A bar for structural purposes provided with deformations affording a mechanical bond and of a character indicative of a physical property of said bar, such deformations being positioned to render the area of cross section of the bar substantially uniform.

4. A bar for structural purposes provided with deformations of a character indicative of a physical property of the bar and other deformations so positioned as to attain an area of cross section of the bar substantially uniform, certain of the deformations affording a mechanical bond.

5. A bar for structural purposes provided with deformations affording a mechanical bond and of a character indicative of a physical property of said bar, said deformations being of such a form as to avoid the presence of a pocket or depression in the surface of the bar and to increase the area of said mechanical bond.

6. A bar for structural purposes provided with means unitary therewith indicative of a physical property, such as the diameter, of said bar and with deformations affording a mechanical bond.

7. A rolled bar for structural purposes provided with integral deformations affording a mechanical bond and of a character indicative of a physical property of the bar, such deformations protruding with respect to the plane of the surface of the bar and being displayed on the surface of said bar so as to be plainly visible.

In testimony whereof I have hereunto subscribed my name.

KARL R. SCHUSTER.